F. O. SMITH.
EARTH PUSHING AND DISTRIBUTING MACHINE.
APPLICATION FILED APR. 29, 1911.
1,032,031.
Patented July 9, 1912.
2 SHEETS—SHEET 1.
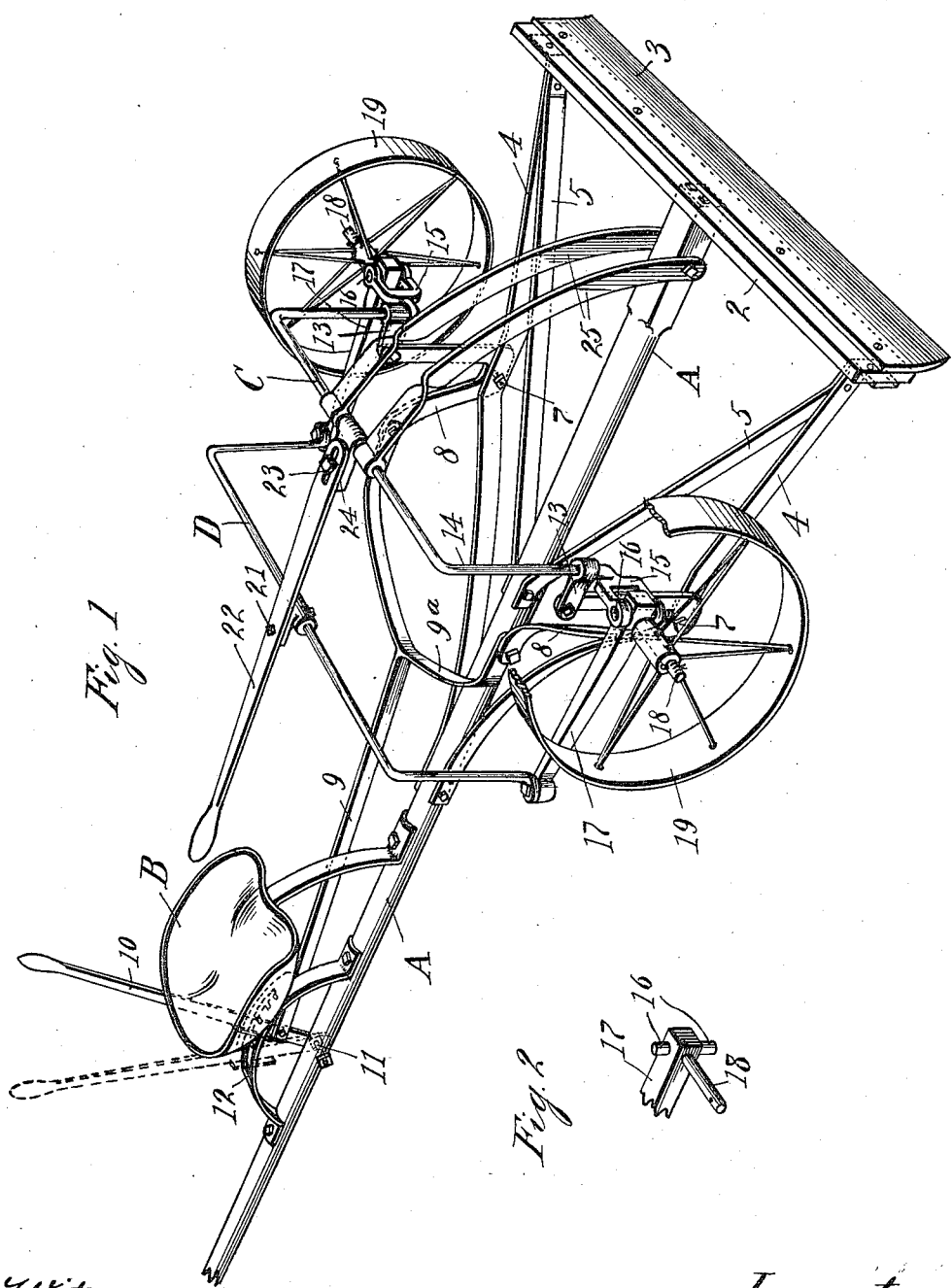

F. O. SMITH.
EARTH PUSHING AND DISTRIBUTING MACHINE.
APPLICATION FILED APR. 29, 1911.
1,032,031.
Patented July 9, 1912.
2 SHEETS—SHEET 2.
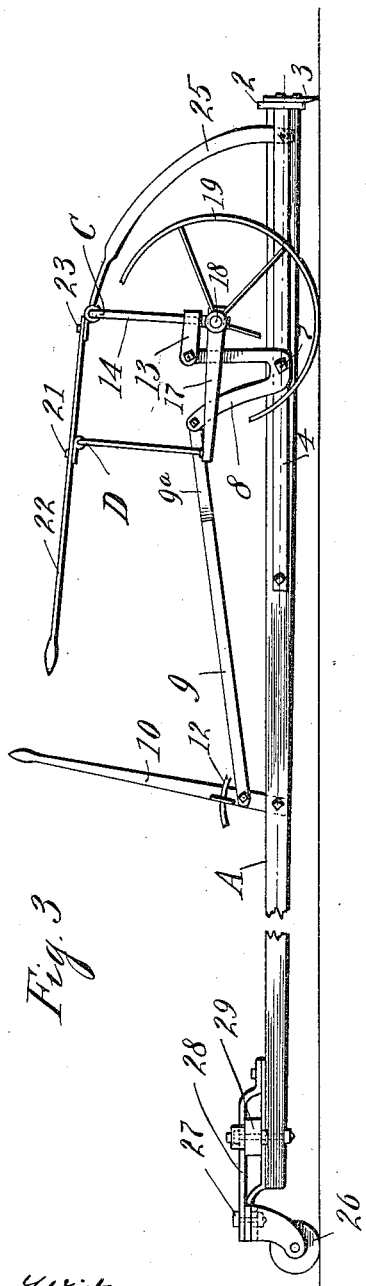
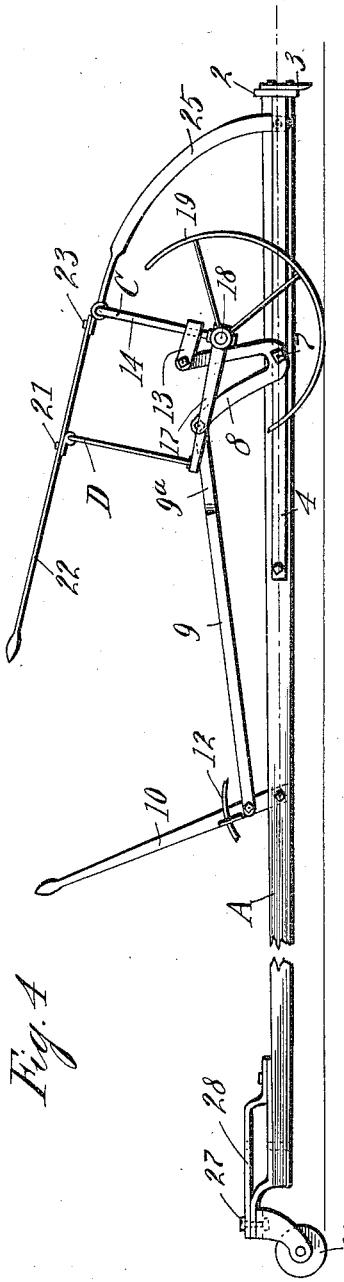
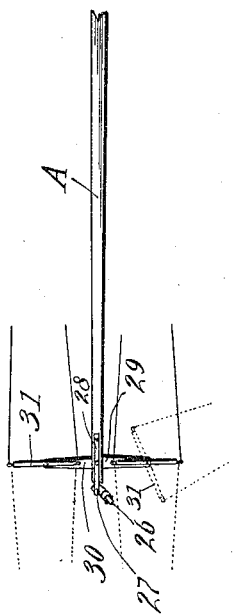
Witnesses,
George Voelker
H. Smith
Inventor,
Frank O. Smith
by Lothrop & Johnson
his Attorneys.

UNITED STATES PATENT OFFICE.

FRANK O. SMITH, OF STEELE, NORTH DAKOTA.

EARTH PUSHING AND DISTRIBUTING MACHINE.

1,032,031.  Specification of Letters Patent.  Patented July 9, 1912.

Application filed April 29, 1911. Serial No. 624,188.

*To all whom it may concern:*

Be it known that I, FRANK O. SMITH, a citizen of the United States, residing at Steele, in the county of Kidder and State of North Dakota, have invented certain new and useful Improvements in Earth Pushing and Distributing Machines, of which the following is a specification.

My invention relates to improvements in earth pushing and distributing machines, and has for its object to provide an improved machine which can be conveniently manipulated to scrape, shove and distribute earth along the shores of ponds or the edges of holes, or at other places over which the draft horses cannot be driven.

To this end the invention consists in the construction, combination, and arrangement of parts hereinafter described and claimed.

In the accompanying drawings forming part of this specification, Figure 1 is a perspective view of the machine with some parts broken away; Fig. 2 is a detail of the bearings for the carrying wheels; Fig. 3 is a side view of the machine, with some parts broken away, showing the earth scraper and pusher in lowered position; Fig. 4 is a similar view, but showing the earth scraper and pusher in raised position; and Fig. 5 is a plan view of the rear end of the machine showing the connections for the draft horses.

In the drawings A represents a pole which runs the length of the machine. At its forward end is a cross-bar 2 which carries a pusher and scraper plate 3, which is preferably dished forwardly near its lower or cutting edge. The cross-bar is bolted at its middle point to the pole and at each end to one or both of the forwardly diverging brackets or braces 4 and 5, which at their other ends are secured to the sides of the pole.

Fulcrumed at 7 upon the outer bracket 4 on each side of the machine is a bell crank 8. The rearward arms of these bell cranks are pivotally connected with the yoke arms 9ª of a link 9, which is pivotally connected with an operating lever 10. This lever is pivotally supported upon the pole A at 11, in a position where it can be operated by the driver from his seat B. It is held in adjusted positions by means of a rack 12 with which it is engageable. The forward arm of each bell crank is pivotally connected with a collar 13 upon one of the vertical crank arms 14 of a rock shaft C, which extends transversely across the machine. The crank arms 14 of the rock shaft terminate at the bottom in laterally projecting jaws or bifurcated portions 15, which constitute upper and lower bearings for the pins 16 upon the ends of the axle bars 17, so that the axle bars swing upon a vertical axis. The axle bars have laterally projecting horizontal axle pins 18 upon which are journaled the carrying wheels 19.

At their rear ends the axle bars 17 are pivotally connected with a steering frame D which extends across the machine. Upon this frame is pivotally supported at 21 a steering bar 22, which terminates at the rear in a handle operable by the driver from his seat, and which at its forward end is pivotally connected by means of slot and pin connection with a collar 24 upon the rock shaft C. The pivotal connections 21 and 23 permit the steering bar 22 to be swung in a horizontal plane, while the slot and pin connection 23 permits the rock shaft C to turn upon a horizontal axis. The rock shaft C is also pivotally connected with the forward end of the pole A by means of braces 25, these braces being sleeved over the rock shaft C, so as to permit the same to be rocked upon a horizontal axis.

At the rear end of the pole is a wheel 26 which has swivel support 27 in the bracket 28. Also having swivel support in this bracket upon the vertical pin 29 is an evener bar 30, in each arm of which is a swiveling swingle tree 31. Thus these swingle trees can be turned through an angle of 180 degrees, to permit the horses to draw the machine backward or forward, according to the necessities of the case.

It will be seen from the foregoing description that the carrying wheels 19 are supported in the vertical crank arms of the rock shaft C, so that when the rock shaft is turned, its bearing jaws 15, and the axle 18 supported in them, will also be turned in the arc of a circle. And this is true whether the rock shaft is turned by raising the steering bar 22; or by turning the bell crank on its fulcrum 7 so as to exert a pull upon the lower ends of the crank arms 14 through the medium of the collar 13. It will also be seen that by pivotally connecting the rear ends of the axle bars 17 with the steering frame D, the axle bars, and consequently the wheels, will be turned by swinging the steering arm to one side or the other on its pivot 23.

In use, when the parts are in the position shown in Figs. 1 and 3, with the lever 10 thrust forward, the pusher plate will stand in lowered position, and the crank arms 14 of the rock shaft C will be vertical. In order to raise the pusher plate from the ground, the lever 10 is drawn back into the position shown in Fig. 4. When so drawn back it will pull upon the rear arms of the bell cranks and turn the bell cranks upon their fulcrums 7. The forward arms of the bell cranks acting upon the lower ends of the crank arms 14 of the rock shaft will pull these arms rearwardly, and turn the rock shaft so that the crank arms 14 will be tilted into the position shown in Fig. 4, whereby the pusher plate will be raised with reference to the wheels. The axle bars 17 and steering frame D will of course be rocked with the rock shaft, this being permitted by the slot and pin connection 23 between the steering bar and rock shaft.

When it is desired to direct the pusher plate to one side or the other, it is only necessary to swing the steering bar 22 to one side or the other, according to the direction desired, for when the steering bar is swung it will carry with it the steering frame D and turn the axle bars 17 in the bearing jaws 15, the bar 22 swinging upon its pivotal connection 23 with the rock shaft, and the wheels 19 turning with the axle bars.

It will be understood that in the operation of pushing and distributing the earth the horses will be headed toward the forward end of the machine, the evener bars above described permitting this, so that, while drawing the machine forward, they will be behind the scraper plate, which will thus be pushed ahead against the earth to be handled, so that the earth can be pushed right up to the edge of a pond or hole, and into the same, without turning the horses or driving them along the edge. When the machine is to be drawn away from the scene of operations, the swingle tree of each horse can be turned about separately as illustrated in the dotted lines in Fig. 5, to bring the horses to face in the opposite direction, so that they can draw the machine back to begin the operation anew, or to draw it home.

In the claims I have used the term "frame" to designate the stationary or supporting part of the machine structure, including the pole A, the cross-bar 2, and the brackets 4 and 5.

I claim as my invention:

1. An earth distributing machine comprising a frame having at its forward end a pusher plate, a rock shaft extending transversely across and above the frame and having downwardly extending crank arms, said arms terminating in laterally projecting vertically spaced jaws, axle bars having vertical pivotal support in said jaws, carrying wheels journaled upon the outer sides of said axle bars, and steering mechanism supported upon the frame and operatively connected with said axle bars, whereby to swing them in unison.

2. An earth distributing machine comprising a frame having at its forward end a pusher plate, a rock shaft supported above the frame at the forward end thereof and extending transversely across the same, said rock shaft having downwardly extending crank arms, wheels carried upon said arms, a pair of bell crank levers fulcrumed upon the frame and connected at their forward ends with the rock shaft, and means carried by the frame and operatively connected with the rear ends of the bell cranks for turning said bell cranks, whereby to turn the rock shaft.

3. An earth distributing machine comprising a frame having at its forward end a pusher plate, a rock shaft extending transversely across the frame and above the same, said rock shaft having downwardly extending crank arms, axle bars rotatable upon a vertical axis in the ends of said crank arms and wheels journaled thereon, a steering frame extending across the machine and pivotally connected with said axle bars, whereby the axle bars can be swung from side to side, and an operating lever pivotally connected with the rock shaft, whereby the rock shaft can be turned to raise or lower the wheels.

4. An earth distributing machine comprising a frame having at its forward end a pusher plate, a rock shaft supported above the frame and extending transversely across the same, said rock shaft having downwardly extending crank arms, axle bars rotatable upon a vertical axis in said crank arms and having laterally projecting axles, wheels journaled upon said axles, a steering frame pivotally connected with said axle bars, a steering bar having sliding pivotal connection with the rock shaft and pivotal connection with the steering frame, and means for turning the rock shaft.

5. An earth distributing machine comprising a frame having at its forward end a pusher plate, a rock shaft supported above the frame at the forward end thereof and extending transversely across the same, said rock shaft having downwardly extending crank arms, wheels carried upon the lower ends of said arms, a pair of bell crank levers fulcrumed upon the frame and connected at their forward ends with the rock shaft, an operating lever, and link-connection between the operating lever and the rear ends of the bell cranks.

In testimony whereof I affix my signature in presence of two witnesses.

FRANK O. SMITH.

Witnesses:
ARTHUR P. LOTHROP,
H. SMITH.

Copies of this patent may be obtained for five cents each, by addressing the "Commissioner of Patents, Washington, D. C."